United States Patent
Sato et al.

(10) Patent No.: US 11,007,655 B2
(45) Date of Patent: May 18, 2021

(54) MANIPULATION UNIT AND ROBOT WITH MANIPULATED SWITCH

(71) Applicant: KABUSHIKI KAISHA YASKAWA DENKI, Kitakyushu (JP)

(72) Inventors: Yuichi Sato, Kitakyushu (JP); Tamio Nakamura, Kitakyushu (JP); Tetsuro Izumi, Kitakyushu (JP); Takashi Nishimura, Kitakyushu (JP); Shohei Ohno, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 16/124,206

(22) Filed: Sep. 7, 2018

(65) Prior Publication Data
US 2019/0099898 A1     Apr. 4, 2019

(30) Foreign Application Priority Data
Sep. 29, 2017     (JP) .............................. JP2017-191089

(51) Int. Cl.
*B25J 9/16*     (2006.01)
*B25J 9/00*     (2006.01)
(Continued)

(52) U.S. Cl.
CPC ......... *B25J 15/0683* (2013.01); *B25J 9/0081* (2013.01); *B25J 9/1664* (2013.01); *B25J 13/02* (2013.01); *B25J 9/161* (2013.01)

(58) Field of Classification Search
CPC .............................. B25J 9/0081; B25J 9/1664
See application file for complete search history.

(56) References Cited

U.S. PATENT DOCUMENTS 4,882,527 A   11/1989   Yakuyama et al.
5,549,016 A    8/1996   Nakako et al.
(Continued)

FOREIGN PATENT DOCUMENTS

DE   10 2015 012962 A1   4/2017
JP         60-163108        8/1985
(Continued)

OTHER PUBLICATIONS

KUKA—Robots & Automation: LBR iiwa—Teaching by Demonstration, Jun. 2, 2014, p. 1, XP054979150, Retrieved from the Internet: URL: https://www.youtube.com/watch?v=PEft1BTHBQU [retrieved on Feb. 19, 2019] *the whole document*.

(Continued)

*Primary Examiner* — Gerald McClain
(74) *Attorney, Agent, or Firm* — Mori & Ward, LLP (57) ABSTRACT

A manipulation unit includes a body, a tool holder, and a manipulated portion. The body has a first end, a second end opposite to the first end, and a peripheral surface connecting the first end and the second end. The first end is attachable to a robot arm. The tool holder is connected to the second end and configured to hold a tool. The manipulated portion is provided on the peripheral surface. The manipulated portion includes a manipulation surface and a surrounding portion. The robot arm is to be operated via the manipulation surface. The surrounding portion surrounds the manipulation surface such that the manipulation surface is recessed from the surrounding portion.

19 Claims, 9 Drawing Sheets

(51) Int. Cl.
  *B25J 15/06* (2006.01)
  *B25J 13/02* (2006.01)

(56) References Cited

U.S. PATENT DOCUMENTS

| | | | |
|---|---|---|---|
| 5,783,922 A | | 7/1998 | Hashimoto et al. |
| 8,986,181 B2* | | 3/2015 | Takazakura ............ G08C 17/04 |
| | | | 483/37 |
| 10,102,985 B1* | | 10/2018 | Pelletier ................. H01H 13/06 |
| 2009/0259412 A1 | | 10/2009 | Brogardh |
| 2015/0290809 A1 | | 10/2015 | Nakagawa et al. |
| 2016/0031078 A1* | | 2/2016 | Kapoor ................ G05B 19/427 |
| | | | 700/258 |
| 2017/0266807 A1* | | 9/2017 | Gombert ................ B25J 9/1617 |
| 2018/0345505 A1* | | 12/2018 | Haddadin .............. B25J 13/025 |

FOREIGN PATENT DOCUMENTS

| | | |
|---|---|---|
| JP | H01-103279 A | 4/1989 |
| JP | 2-36085 A | 2/1990 |
| JP | 6-8168 A | 1/1994 |
| JP | H06-312394 A | 11/1994 |
| JP | 09-062334 | 3/1997 |
| JP | 9-141460 A | 6/1997 |
| JP | 2015-199174 | 11/2015 |
| WO | WO 2017/064851 | 4/2017 |

OTHER PUBLICATIONS

3DMaus: "Roberta—your best friend", Jun. 16, 2014, p. 1, XP054979151, Retrieved from the Internet: URL: https://www.youtube.com/watch?v=bHa4tR8zCLY [retrieved on Feb. 19, 2019] * the whole document *.
Extended European Search Report for corresponding EP Application No. 18197596, dated Apr. 15, 2019.
Japanese Office Action for corresponding JP Application No. 2017-191089, dated May 21, 2019 (w/ machine translation).
Japanese Office Action for corresponding JP Application No. 2017-191089, dated Dec. 3, 2019 (w/ machine translation).
Japanese Office Action for corresponding JP Application No. 2017-191089, dated Jun. 23, 2020 (w/ English machine translation).

* cited by examiner

MANIPULATION UNIT AND ROBOT WITH MANIPULATED SWITCH

CROSS-REFERENCE TO RELATED APPLICATIONS

The present application claims priority under 35 U.S.C. § 119 to Japanese Patent Application No. 2017-191089, filed Sep. 29, 2017. The contents of this application are incorporated herein by reference in their entirety.

BACKGROUND

Field of the Invention

The embodiments disclosed herein relate to a manipulation unit and a robot.

Discussion of the Background

JP 2015-199174A discloses a robot that makes a motion by driving a plurality of joints. The robot includes a tool at the leading end of the robot. The tool varies depending on the application in which the robot is used, such as suction and holding, so that the robot is capable of performing various kinds of work such as holding and moving a workpiece.

The robot also includes a bar-shaped handle for a user to hold to change the posture of the robot. This enables the user to manually and directly teach the robot tasks such as which motion path to take.

SUMMARY

According to one aspect of the present disclosure, a manipulation unit includes a body, a tool holder, and a manipulated portion. The body has a first end, a second end opposite to the first end, and a peripheral surface connecting the first end and the second end. The first end is attachable to a robot arm. The tool holder is connected to the second end and configured to hold a tool. The manipulated portion is provided on the peripheral surface. The manipulated portion includes a manipulation surface and a surrounding portion. The robot arm is to be operated via the manipulation surface. The surrounding portion surrounds the manipulation surface such that the manipulation surface is recessed from the surrounding portion.

According to another aspect of the present disclosure, a robot includes a wrist, and a manipulation unit. The wrist has a leading end. The manipulation unit includes a body, a tool holder, and a manipulated portion. The body has a first end, a second end opposite to the first end, and a peripheral surface connecting the first end and the second end. The first end is attachable to the leading end. The tool holder is connected to the second end and is configured to hold a tool. The manipulated portion is provided on the peripheral surface. The manipulated portion includes a manipulation surface and a surrounding portion. A robot arm is to be operated via the manipulation surface. The surrounding portion surrounds the manipulation surface such that the manipulation surface is recessed from the surrounding portion.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, a manipulation unit and a robot according to embodiments of the present disclosure will be described in detail below. It is noted that the following embodiments are provided for exemplary purposes only and are not intended in a limiting sense. It is also noted that while in the following description the manipulation unit is attached to the leading end of the robot, the manipulation unit may also be attached to any other various machines, apparatuses, and/or devices that have leading ends to which tools are attachable.

Also in the following description, tetras such as "orthogonal", "perpendicular", "parallel", and "vertical" may not necessarily be used in a strict sense. That is, these terms are used with production-related and installation-related tolerances and errors taken into consideration.

Figure 1:
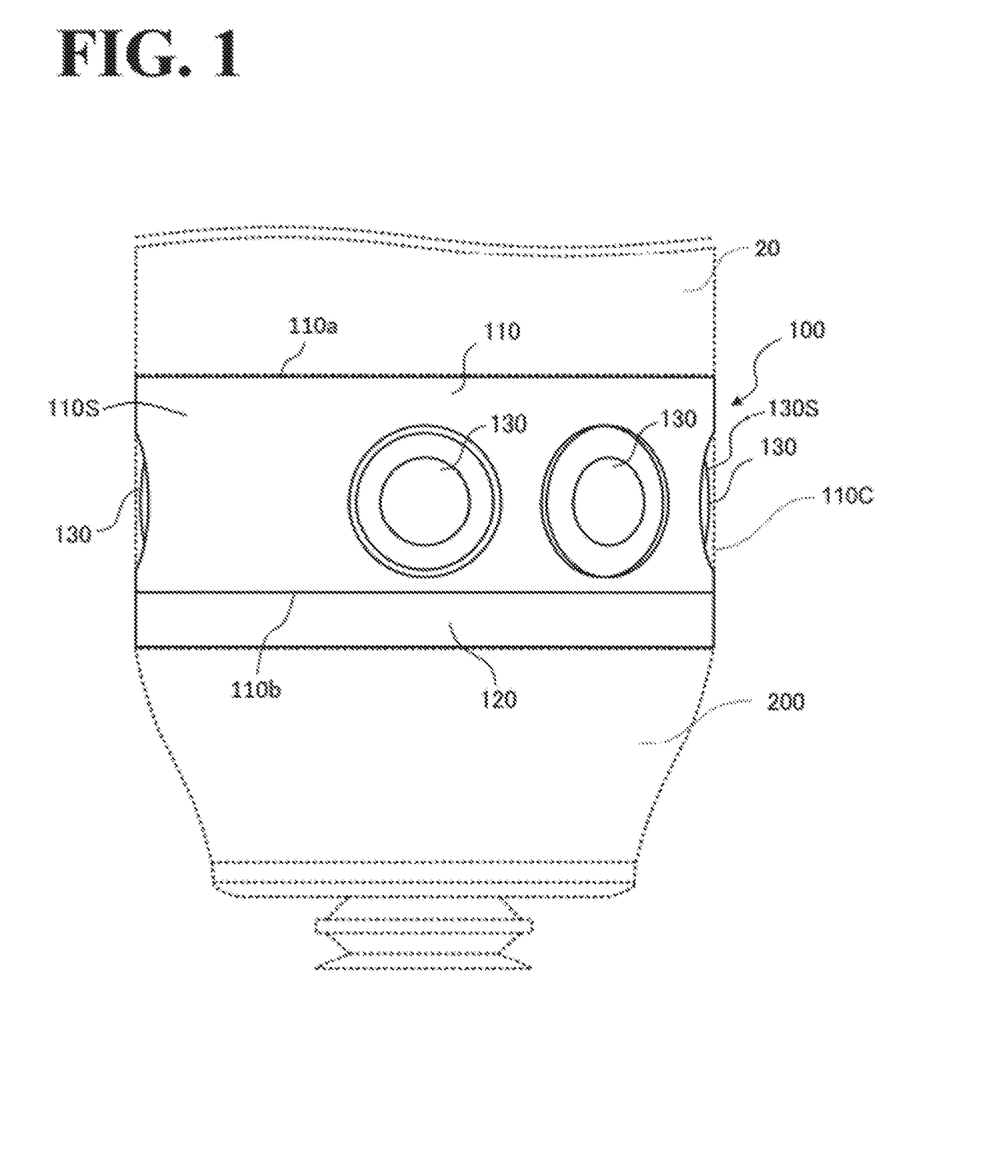
FIG. 1 is a side view of a manipulation unit according to an embodiment illustrating an outline of the manipulation unit.

A manipulation unit 100 according to this embodiment will be outlined by referring to FIG. 1. FIG. 1 is a side view of the manipulation unit 100 according to this embodiment illustrating an outline of the manipulation unit 100. For reference purposes, broken lines are used in FIG. 1 to indicate the leading end of a robot 20, which is an attachment target to which the manipulation unit 100 is attachable, and indicate a tool 200, which is attachable to the manipulation unit 100.

As illustrated in FIG. 1, the manipulation unit 100 includes a body 110 and a tool holder 120. The body 110 and the tool holder 120 have similar outer circumferential surfaces. The body 110 of the manipulation unit 100 has a first end surface (a first end) 110a and a second end surface (second end) 110b. The first end surface is attached to the robot 20, and the tool holder 120 is attached to the second end surface.

In this embodiment, the manipulation unit 100 has a cylindrical outer shape. The manipulation unit 100, however, may have any other outer shape insofar as the circumferential outer surface of the manipulation unit 100 is flush with the circumferential outer surface of the attachment target. Also in this embodiment, the size of the circumferential outer surface of the manipulation unit 100 is such that the manipulation unit 100 can be held in the palm of a hand of a user.

As illustrated in FIG. 1, the manipulation unit 100 also includes manipulated portions 130. The manipulated portions 130 (manipulated switches) are located on the circumferential outer surface 110S of the body 110. A non-limiting example of each manipulated portion 130 is a button manipulated by the user. Each manipulated portion 130 has a manipulated surface 130S that is set deeper in the body 110 than a surrounding portion 130C of the manipulated portion 130 surrounding the manipulated surface (see the manipulated portion 130 with the broken line indicating the circumferential outer surface of the body 110). Thus, the manipulated surface of each manipulated portion 130 is set deeper in the body 110 than the surrounding portion of the manipulated portion 130 surrounding the manipulated surface. This prevents the manipulated portions 130 from being manipulated erroneously, resulting in improved manipulability of the manipulated portions 130. It will be understood by those skilled in the art that each manipulated portion 130 may be a "membrane switch".

Also as illustrated in FIG. 1, there are no protrusions on the circumferential outer surface of the manipulation unit 100, and the leading end of the robot 20 and the tool 200 are flush with each other. That is, the manipulation unit 100 have no protrusions by which the user might become caught, resulting in improved manipulability of the manipulated portions 130.

Also as illustrated in FIG. 1, the manipulation unit 100 is located between the leading end of the robot 20 and the tool 200. This enables the user to manipulate the manipulation unit 100 while visually checking the current position of the tool 200. This also results in improved manipulability of the manipulated portions 130.

In this embodiment, the manipulated surface of each manipulated portion 130 is set deeper in the body 110 than the surrounding portion of the manipulated portion 130 surrounding the manipulated surface. In another possible embodiment, the manipulated surface of each manipulated portion 130 may be flush with or protrude beyond the circumferential outer surface of the body 110, and the manipulated surface may be surrounded by a protrusion that protrudes beyond the manipulated surface. In this case, such protrusion may be provided on the manipulated portion 130 or may be provided on the circumferential outer surface of the body 110.

Also as illustrated in FIG. 1, a plurality of manipulated portions 130 are aligned at intervals in the circumferential direction of the body 110. The circumferential alignment of the manipulated portions 130 makes the height of the manipulation unit 100 lower than when the manipulated portions 130 are arranged in a direction crossing the circumferential direction. The interval alignment of the manipulated portions 130 prevents the manipulated portions 130 from being manipulated erroneously, resulting in improved manipulability of the manipulated portions 130.

In the embodiment illustrated in FIG. 1, the tool 200 is a suction tool, which holds an object by air suction. It is also possible to attach any other kind of tool 200 to the manipulation unit 100. Other examples of the tool 200 attachable to the manipulation unit 100 include, but are not limited to, a holding tool including a plurality of movable claws; and an ejection tool that ejects air or coating material.

Figure 2:
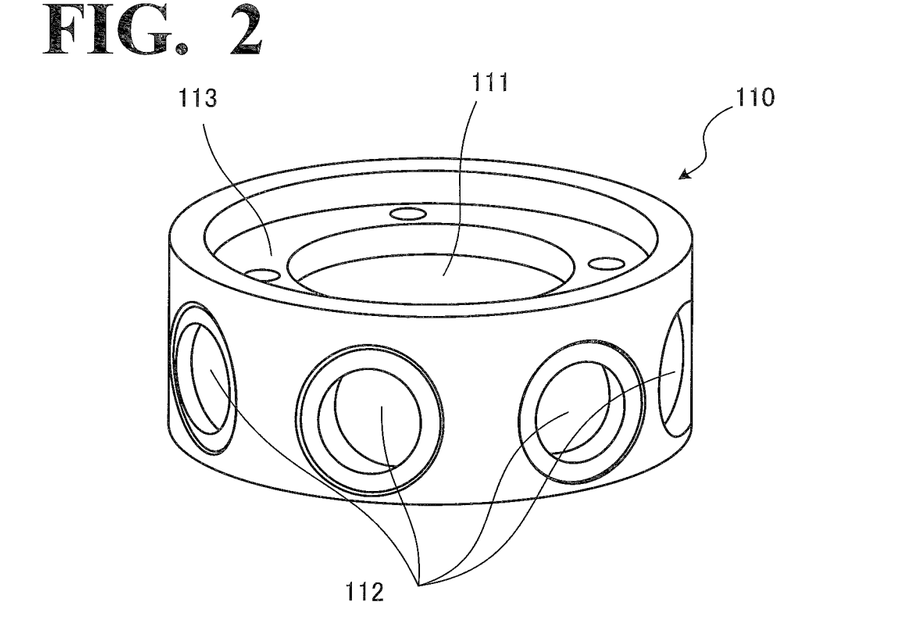
FIG. 2 is a perspective view of a body of the manipulation unit.

The body 110 and the tool holder 120 of the manipulation unit 100 illustrated in FIG. 1 will be described in more detail below by referring to FIGS. 2 to 9. FIG. 2 is a perspective view of the body 110. Specifically, FIG. 2 is a perspective view of the body 110 as seen from the attachment target (from the robot 20 illustrated in FIG. 1).

As illustrated in FIG. 2, the body 110 has a cylindrical shape having a first through hole 111. The first through hole 111 extends between the first end surface and the second end surface. The body 110 also includes an inward protruding flange 113 on the inner circumferential surface of the body 110. The flange 113 is used to attach the manipulation unit 100 (see FIG. 1) to the attachment target.

The body 110 also includes a plurality of second through holes 112. The second through holes 112 are aligned at intervals in the circumferential direction and penetrate the body 110 to be connected to the first through hole 111. Thus, the body 110 has the first through hole 111 and the second through holes 112, which are connected to the first through hole 111. This increases the efficiency with which the internal space of the body 110 is used.

The internal space of the body 110 eliminates the need for protrusions on the outer surface of the body 110. In this embodiment, the first through hole 111 and the second through holes 112 have circular contours. In another possible embodiment, the first through hole 111 and the second through holes 112 may have elliptic contours, or may have rectangular or other polygonal contours with chamfered corners.

Figure 3:
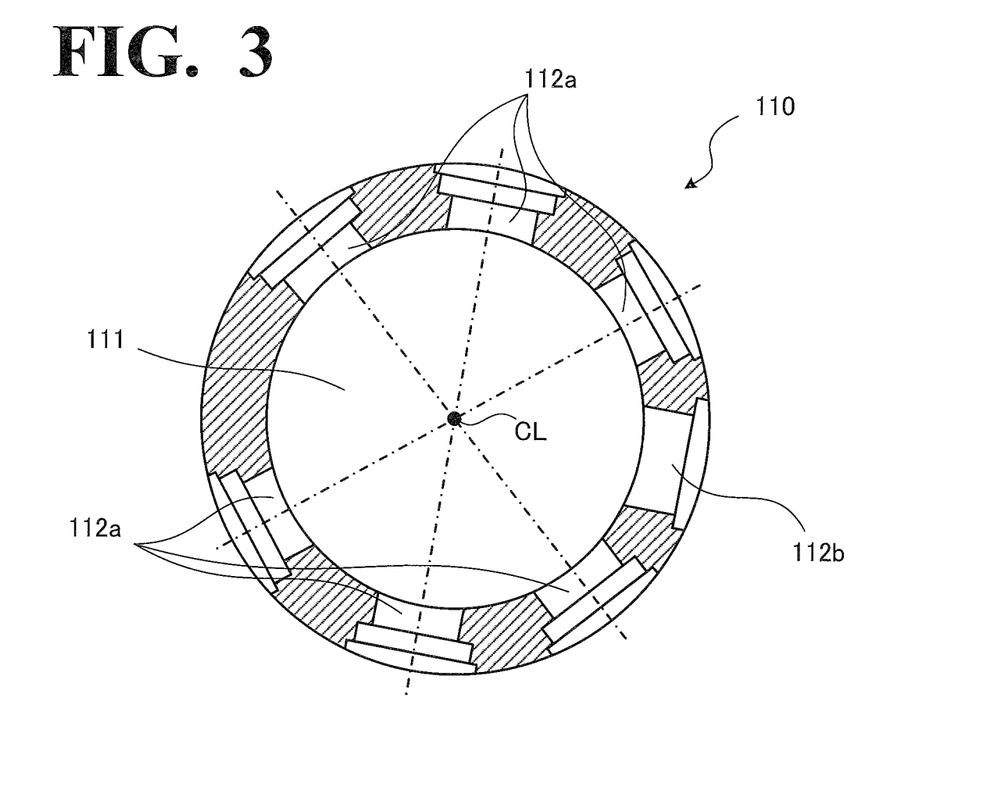
FIG. 3 is a cross-sectional view of the body.

A cross-section shape of the body 110 will be described by referring to FIG. 3. FIG. 3 is a cross-sectional view of the body 110. Specifically, FIG. 3 is a cross-sectional view of the body 110 as seen from the flange 113 and including axial center lines of the plurality of second through holes 112 illustrated in FIG. 2.

As illustrated in FIG. 3, the second through holes 112 include second through holes 112a and a second through hole 112b. The second through holes 112a are through holes in which the respective manipulated portions 130 illustrated in FIG. 1 are located. The second through hole 112b is a through hole in which no manipulated portion 130 is located. In this respect, the second through holes 112a, each accommodating a manipulated portion 130, include a first "group" of second through holes 112a aligned with each other and a second "group" of second through holes 112a aligned with each other.

Thus, a plurality of groups of second through holes 112a are provided. This enables the manipulation unit 100 (see FIG. 1) to be manipulated from different directions. In the embodiment illustrated in FIG. 3, two groups each made up of three second through holes 112a are provided in the body 110. The number of second through holes 112a constituting each group will not be limited to three, and the number of groups will not be limited to two.

As illustrated in FIG. 3, a second through hole 112a and another second through hole 112a are point-symmetrical to each other relative to an axial center line CL of the body 110. In each of the second through holes 112a, one of the manipulated portion 130 illustrated in FIG. 1 is located. Therefore, when the body 110 illustrated in FIG. 3 is used in the manipulation unit 100 (see FIG. 1), there are two groups of three manipulated portions 130 located in the manipulation unit 100.

Since the second through holes 112a are point-symmetrical to each other relative to the axial center line CL, the two groups of three manipulated portions 130 are point-symmetrical to each other relative to the axial center line CL. As described later, the manipulated portions 130 included in each group play different roles, and manipulated portions 130 playing the same role are point-symmetrical to each other relative to the axial center line CL.

The second through hole 112b, in which no manipulated portion 130 is located, may be used to accept external wiring to be connected to the tool 200. When the second through hole 112b is not in use, the second through hole 112b is covered with a lid. In the embodiment illustrated in FIG. 3, one second through hole 112b is provided. In another possible embodiment, two second through holes 112b that are point-symmetrical to each other relative to the axial center line CL may be provided. In still another possible embodiment, no second through hole 112b may be provided.

The second through hole 112b may have a shape similar to the shape of each first through hole 112a, or each first through hole 112a may have a shape similar to the shape of the second through hole 112b. Also, each first through hole 112a may, instead of accommodating a manipulated portion 130, be used to accept external wiring to be connected to the tool 200.

Figure 4:
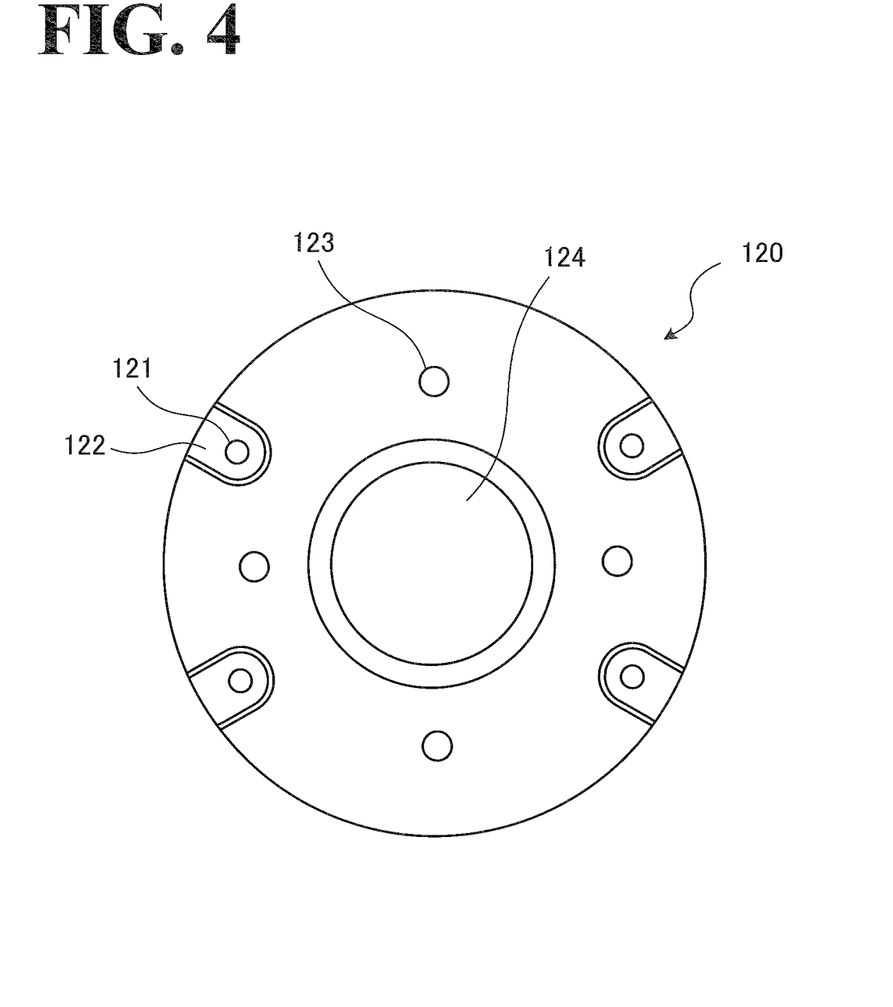
FIG. 4 is a front view of a tool holder of the manipulation unit.

The tool holder 120 will be described by referring to FIG. 4. FIG. 4 is a front view of the tool holder 120. Specifically, FIG. 4 is a front view of the tool holder 120 as seen from the tool 200 illustrated in FIG. 1. The diameter of the tool holder 120 is approximately the same as the diameter of the body 110 illustrated in FIG. 3, as illustrated in FIG. 1. In another possible embodiment, the diameter of the tool holder 120 may be smaller than the diameter of the body 110.

As illustrated in FIG. 4, the tool holder 120 has first attachment holes 121. The first attachment holes 121 are used to attach the tool holder 120 to the body 110. Around each first attachment hole 121, the tool holder 120 has a counterbore 122. The counterbore 122 forms a lower-height step portion. The counterbore 122 is for the purpose of preventing the head of a screw or a similar tool inserted into the first attachment hole 121 from protruding beyond the surface of the tool holder 120.

Also as illustrated in FIG. 4, the tool holder 120 has second attachment holes 123. The second attachment holes 123 are used to attach the tool 200 (see FIG. 1) to the tool holder 120. In terms of position, size, and number, the second attachment holes 123 may correspond to the holes provided on a flange that is located at the leading end of the robot 20 and that is used to attach the tool 200 to the robot 20. This ensures that the tool 200 attachable to the leading end of the robot 20 can be directly attached to the manipulation unit 100.

The tool holder 120 also has an opening 124. The opening 124 is connected to the first through hole 111 of the body 110. The edge of the opening 124 is chamfered to protect cables and/or wires extending to the tool 200. In terms of position and size, the opening 124 may correspond to the hole provided on the flange located at the leading end of the robot 20.

It will be understood by those skilled in the art that the positions and number of the first attachment holes 121 and the second attachment holes 123 illustrated in FIG. 4 are not intended in a limiting sense. The first attachment holes 121 and the second attachment holes 123 may be provided at any other positions, and/or any different number of the first attachment holes 121 and the second attachment holes 123 may be provided. Also, the tool holder 120 itself may have approximately the same shape as the shape of the flange that is located at the leading end of the robot 20 and that is used to attach the tool 200 to the robot 20.

Figure 5:
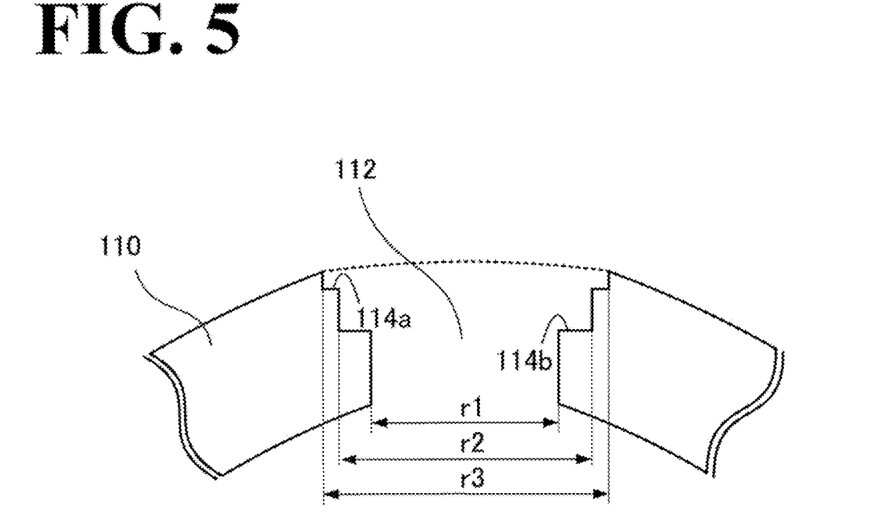
FIG. 5 is a schematic illustrating a second through hole of the body.

By referring to FIG. 5, description will be made with regard to the shape of each second through hole 112 of the body 110 and the shapes of portions surrounding the second through hole 112. FIG. 5 is a schematic illustrating a second through hole 112 of the body 110. Specifically, FIG. 5 is a cross-sectional view of a second through hole 112 corresponding to one of the second through holes 112 illustrated in FIG. 3. In FIG. 5, the hatching illustrated in FIG. 3 is omitted.

As illustrated in FIG. 5, the second through hole 112 extends between the outer circumferential surface and the inner circumferential surface of the body 110, penetrating the body 110. The second through hole 112 has a diameter of r1. On the outer circumferential surface of the body 110, two steps of counterbores are provided. A first counterbore 114a, which is a first step, has an outer diameter of r3, which is larger than the diameter H. A second counterbore 114b, which is a second step, has an outer diameter of r2, which is smaller than the diameter r3 and larger than the diameter r1. That is, these diameters have a relationship represented by "diameter r1<diameter r2<diameter r3". In the second through hole 112 and the two steps of counterbores 114a and 114b, a manipulated portion 130 illustrated in FIG. 1 is located.

Figure 6:
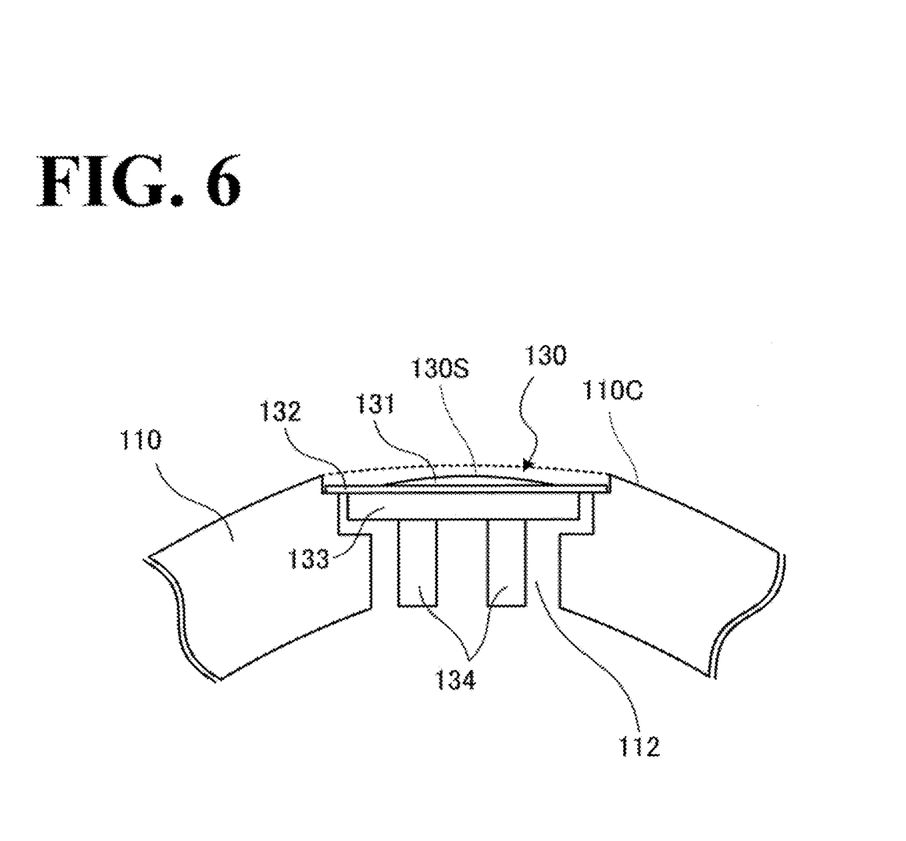
FIG. 6 is a schematic illustrating a manipulated portion mounted in the second through hole.

FIG. 6 is a schematic illustrating a manipulated portion 130 mounted in the second through hole 112. FIG. 6 is equivalent to the cross-sectional view illustrated in FIG. 5 with an addition of the manipulated portion 130. As illustrated in FIG. 6, the manipulated portion 130 includes a protruding portion 131, a planar portion 132, and a substrate portion 133. The protruding portion 131 has a manipulated surface on the outer surface of the protruding portion 131. On the outer surface of the planar portion 132, the protruding portion 131 is mounted. The substrate portion 133 is located on the inner surface of the planar portion 132. On the inner surface of the substrate portion 133, two connectors 134 are located. As illustrated in FIG. 6, the outer surface of the protruding portion 131 is located further inward than the outer circumferential surface of the body 110 (see the broken line illustrated in FIG. 6).

In this embodiment, the protruding portion 131 and the planar portion 132 are mainly made of elastic resin that makes the protruding portion 131 and the planar portion 132 deformable by pressing the protruding portion 131, providing the user a sense of pressing action. The substrate portion 133 includes therein a sensor and a substrate. The sensor detects a manipulation performed on the protruding portion 131. The substrate is connected with a light emitting device, such as light emitting diode (LED), that emits light upon detection of the manipulation. The connectors 134 are electrically connected to the substrate included in the substrate portion 133.

The circumference of the planar portion 132 is fixed to the first counterbore 114a illustrated in FIG. 5 using adhesive or by other means of fixing. A gap is defined between the inner surface of the substrate portion 133 and the second counterbore 114b. Specifically, the manipulated portion 130 is attached to the body 110 with the substrate portion 133 kept apart from the second counterbore 114b. This ensures a depth of stroke implemented by a pressing of the protruding portion 131.

Figure 7:
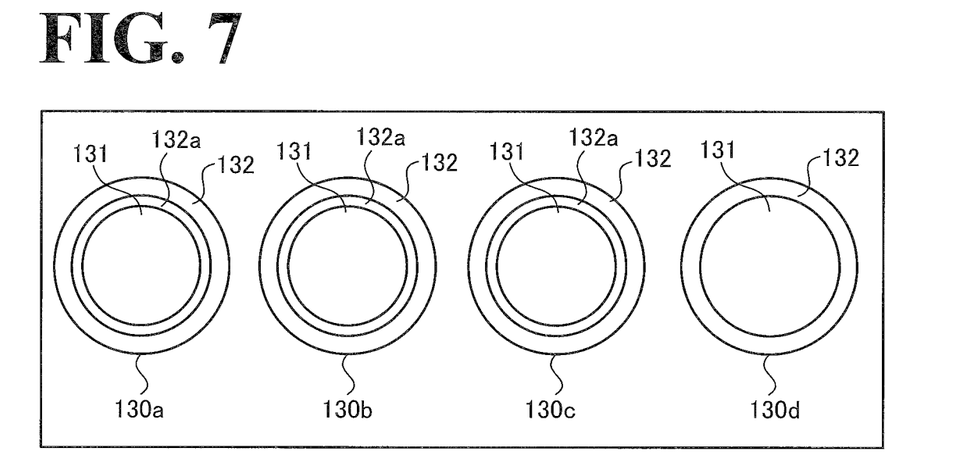
FIG. 7 illustrates variations of the manipulated portion.

Variations of the manipulated portions 130 will be described by referring to FIG. 7. As illustrated in FIG. 7, the manipulated portions 130 may be buttons represented by a teaching button 130a, an enabling button 130b, a tool button 130c, and a mode button 130d.

The body 110 illustrated in FIG. 3 and other drawings has six second through holes 112a, for six manipulated portions 130. In light of this, three buttons selected from among the four buttons may form one group, and two groups of three buttons may be aligned on the body 110. When three buttons are selected from among the four examples of buttons illustrated in FIG. 7, the teaching button 130a and the enabling button 130b are preferably included in the three buttons.

The teaching button 130a includes a light-transmittable portion 132a on the planar portion 132 and around the protruding portion 131. The light-transmittable portion 132a is made of a transparent or semi-transparent material that transmits internal light. It will be understood by those skilled in the art that a letter(s), an illustration(s), a sign(s), and/or a symbol(s) may be put on the protruding portion 131 (by printing or other means) to indicate what type of button the teaching button 130a is.

The teaching button 130a is pressed when the user performs direct teaching to the robot 20 (see FIG. 1). Direct teaching is to, while changing the posture of the robot 20, manually and directly teach the robot 20 which motion path to take and teach the tool 200 (see FIG. 1) how to move. The user presses the teaching button 130a when the tool 200 is at the position that the user wants to teach to the tool 200. Upon pressing of the teaching button 130a, the light-transmittable portion 132a emits light momentarily to notify the user that the teaching button 130a has certainly been pressed.

The enabling button 130b has a shape similar to the shape of the teaching button 130a. The user keeps pressing the enabling button 130b for a period of time that the user wants to perform a lead-through operation. A lead-through operation is to change the posture of the robot 20 using the manipulation force with which the user manipulates the robot 20. It will be understood by those skilled in the art that a letter(s), an illustration(s), a sign(s), and/or a symbol(s) may be put on the protruding portion 131 (by printing or other means) to indicate what type of button the enabling button 130b is.

For the period of time when the enabling button 130b is being pressed, the light-transmittable portion 132a keeps emitting light to notify the user that the lead-through operation is valid. Upon release of the enabling button 130b, the light-transmittable portion 132a stops emitting light to notify the user that the lead-through operation is invalid.

The tool button 130c has a shape similar to the shape of the teaching button 130a. It is noted, however, that the tool button 130c is alternately switched ON and OFF every time the tool button 130c is pressed. It will be understood by those skilled in the art that a letter(s), an illustration(s), a sign(s), and/or a symbol(s) may be put on the protruding portion 131 (by printing or other means) to indicate what type of button this button is. When the tool 200 is a suction tool, as illustrated in FIG. 1, switching the tool button 130c ON causes the tool 200 to perform suction operation, and switching the tool button 130c OFF causes the tool 200 to stop the suction operation.

When the tool 200 is a holding tool, switching the tool button 130c ON causes the plurality of claws of the holding tool to move toward each other, and switching the tool button 130c OFF causes the plurality of claws of the holding tool to move away from each other. Also, switching the tool button 130c ON causes the light-transmittable portion 132a to emit light to notify the user that the tool 200 is in ON state.

The mode button 130d is different from the teaching button 130a in that the mode button 130d has no light-transmittable portion 132a. Examples of usage of the mode button 130d include, but are not limited to, to switch coordinate mode, such as between world coordinate and tool coordinate; and to switch interpolation mode, such as between lines and curves used to connect a plurality of teaching positions (teaching points). Every time the mode button 130d is pressed, a plurality of modes are switched by turns.

It will be understood by those skilled in the art that a letter(s), an illustration(s), a sign(s), and/or a symbol(s) may be put on the protruding portion 131 (by printing or other means) to indicate what type of button the mode button 130d is. The mode button 130d may also have illustrations (or any other form of indication) indicating the respective modes and recognizable by light emission, and change one illustration to another illustration every time one mode is switched to another mode. This enables the user to be notified of the current mode. It will be understood by those skilled in the art that the number of modes may be two or more.

It is also possible to provide braille dots or other raised markings on the protruding portion 131 of each manipulated portion 130 illustrated in FIG. 7. This enables the user who is manipulating a manipulated portion 130 to recognize the type of the manipulated portion 130 without visually checking the manipulated portion 130. It is also possible for the protruding portions 131 of the manipulated portions 130 to vary in shape and/or size depending on the types of the manipulated portions 130. With this configuration as well, the user is able to recognize the type of a manipulated portion 130 without visually checking the manipulated portion 130.

In this embodiment, each manipulated portion 130 is a unitized switch having a structure as simple as a membrane switch, for example. This facilitates removal and replacement of the manipulated portion 130. More specifically, a manipulated portion 130 can be more easily replaced with another manipulated portion 130 different in shape and application.

Figure 8:
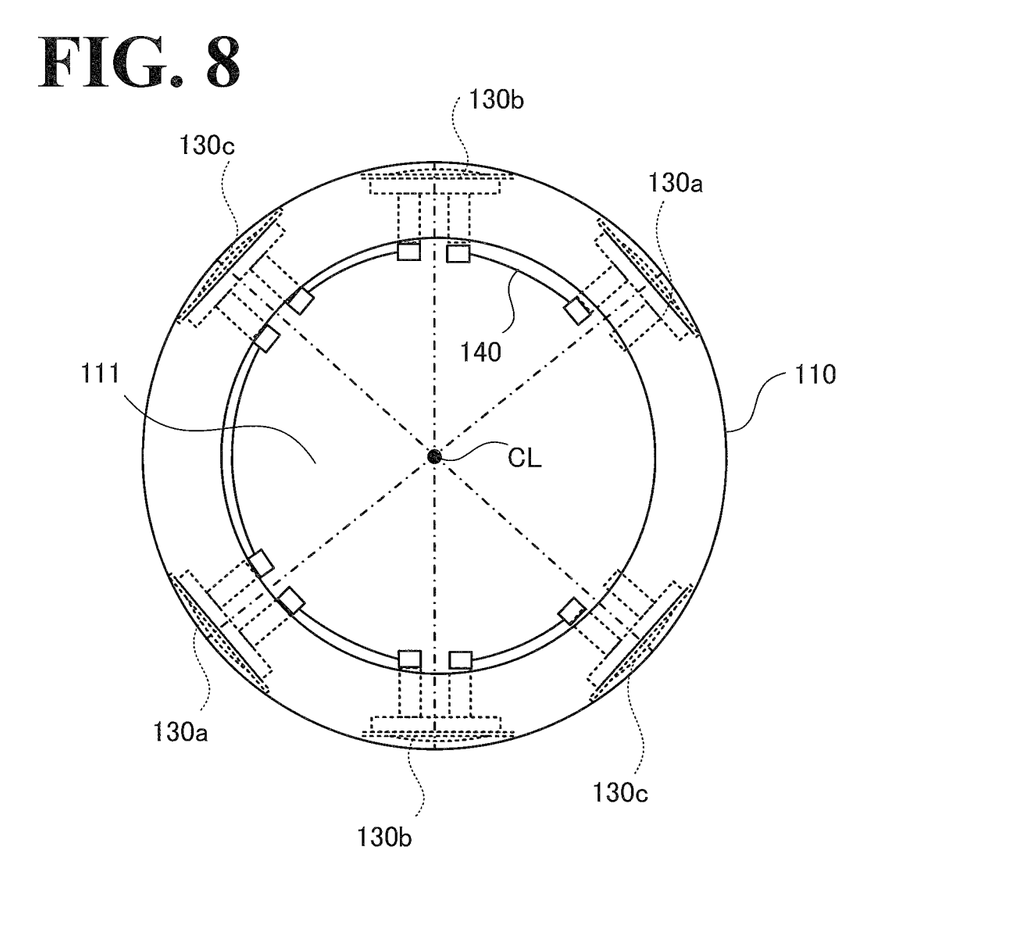
FIG. 8 illustrates an exemplary arrangement of manipulated portions.

An exemplary arrangement of the manipulated portions 130 illustrated in FIG. 7 will be described by referring to FIG. 8. FIG. 8 illustrates an exemplary arrangement of the manipulated portions 130. Specifically, FIG. 8 is a cross-sectional view of the body 110 equivalent to the cross-sectional view illustrated in FIG. 3. In FIG. 8, the hatching illustrated in FIG. 3 is omitted. The example illustrated in FIG. 8 is that three kinds of buttons, namely, the manipulated portions 130a, 130b, and 130c illustrated in FIG. 7 are arranged on the body 110 (with the manipulated portion 130d excluded).

As illustrated in FIG. 8, two teaching buttons 130a are located at positions that are point-symmetrical to each other relative to the axial center line CL of the body 110. Similarly, two enabling buttons 130b are located at positions that are point-symmetrical to each other relative to the axial center line CL of the body 110. Similarly, two tool buttons 130c are located at positions that are point-symmetrical to each other relative to the axial center line CL of the body 110.

That is, the teaching button 130a, and the enabling button 130b, and the tool button 130c form one group, and two such groups are located at positions that are point-symmetrical to each other relative to the axial center line CL of the body 110. Arranging the manipulated portions 130 in this manner enables the user to manipulate the manipulation unit 100 (see FIG. 1) irrespective of where the user is standing.

As illustrated in FIG. 8, the manipulated portions 130 are connected in series to each other through manipulated-portion cables 140. Specifically, the manipulated portions 130 are connected in series to each other through five manipulated-portion cables 140. Each manipulated-portion cable 140 has connectors at both ends of the manipulated-portion cable 140, and one of the connectors is connected to one of the connectors 134 illustrated in FIG. 6. Each manipulated portion 130 obtains, through either connector 134, a signal that has been transmitted through a wire, among wires included in the manipulated-portion cables 140, that is relevant to the manipulated portion 130.

In the embodiment illustrated in FIG. 8, the five manipulated-portion cables 140 include, in the counter-clockwise direction, a first manipulated-portion cable 140 connecting the teaching button 130a and the enabling button 130b to each other; a second manipulated-portion cable 140 connecting the enabling button 130b and the tool button 130c to each other; a third manipulated-portion cable 140 connecting the tool button 130c and the teaching button 130a to each other; a fourth manipulated-portion cable 140 connecting the teaching button 130a and the enabling button 130b to each other; and a fifth manipulated-portion cable 140 connecting the enabling button 130b and the tool button 130c to each other.

One end of the series connection of the manipulated portions 130 is a teaching button 130a, and the other end of the series connection of the manipulated portions 130 is a tool button 130c. Each of these teaching button 130a and tool button 130c has one connector 134 (see FIG. 6) left unconnected to a manipulated-portion cable 140. This connector 134, instead, is connected to the robot 20 (see FIG. 1). Thus, the manipulated portions 130 are connected in series to each other through the manipulated-portion cables 140. This ensures that the first through hole 111 can be used more efficiently than when cables are routed individually to the manipulated portions 130.

A non-limiting example of each manipulated-portion cable 140 is a flexible cable in which a plurality of wires are combined into a planar shape. The manipulated-portion cables 140 are routed on the inner circumferential surface of the first through hole 111 of the body 110, that is, on the inner wall of the body 110.

Thus, the manipulated-portion cables 140 are routed on the inner circumferential surface of the body 110. This ensures that the space around the center of the first through hole 111 is left as empty space that can be used for any other purposes. The empty space also eliminates or minimizes interference between the manipulated-portion cables 140 and cables and/or wires extending between the robot 20 (see FIG. 1) and the tool 200 (see FIG. 1).

Figure 9:
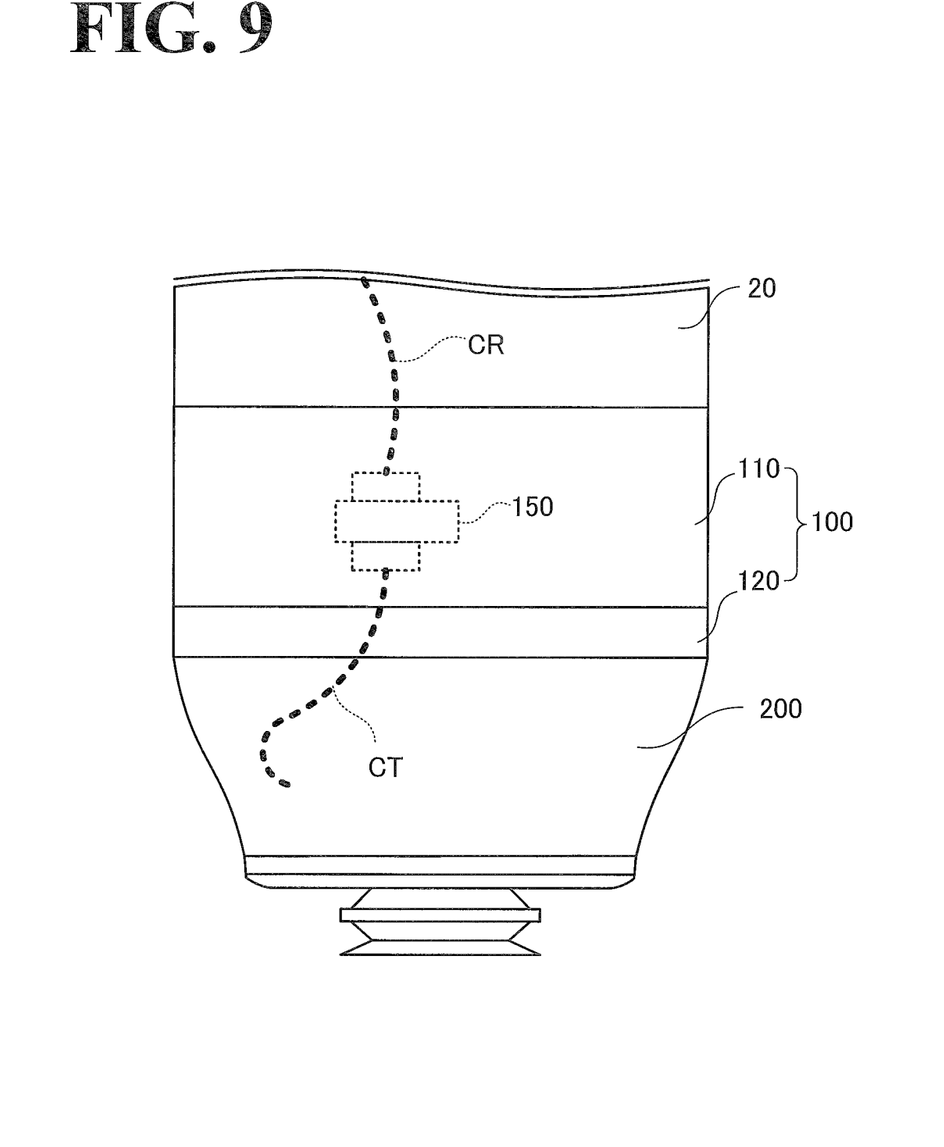
FIG. 9 illustrates a relay connector for cables.

The manipulation unit 100 has a configuration that facilitates an electrical connection between the robot 20 and the tool 200. This configuration will be described by referring to FIG. 9. FIG. 9 illustrates a relay connector 150, which is for cables.

As illustrated in FIG. 9, the manipulation unit 100 includes the relay connector 150. The relay connector 150 connects a robot cable (attachment-target cable) CR and a tool cable CT to each other. The robot cable CR extends from the robot 20, and the tool cable CT extends from the tool 200. A connector connected to the relay connector 150 is attached to one end of the robot cable CR. Similarly, a connector connected to the relay connector 150 is attached to one end of the tool cable CT.

The relay connector 150 may be fixed to, for example, the inner wall of the first through hole 111 of the body 110 of the manipulation unit 100. Thus, the manipulation unit 100 includes therein the relay connector 150. This facilitates the work of connecting the robot 20 and the tool 200 to each other, with the manipulation unit 100 attached to the robot 20 and with the tool 200 attached to the tool holder 120 of the manipulation unit 100.

Figure 10:
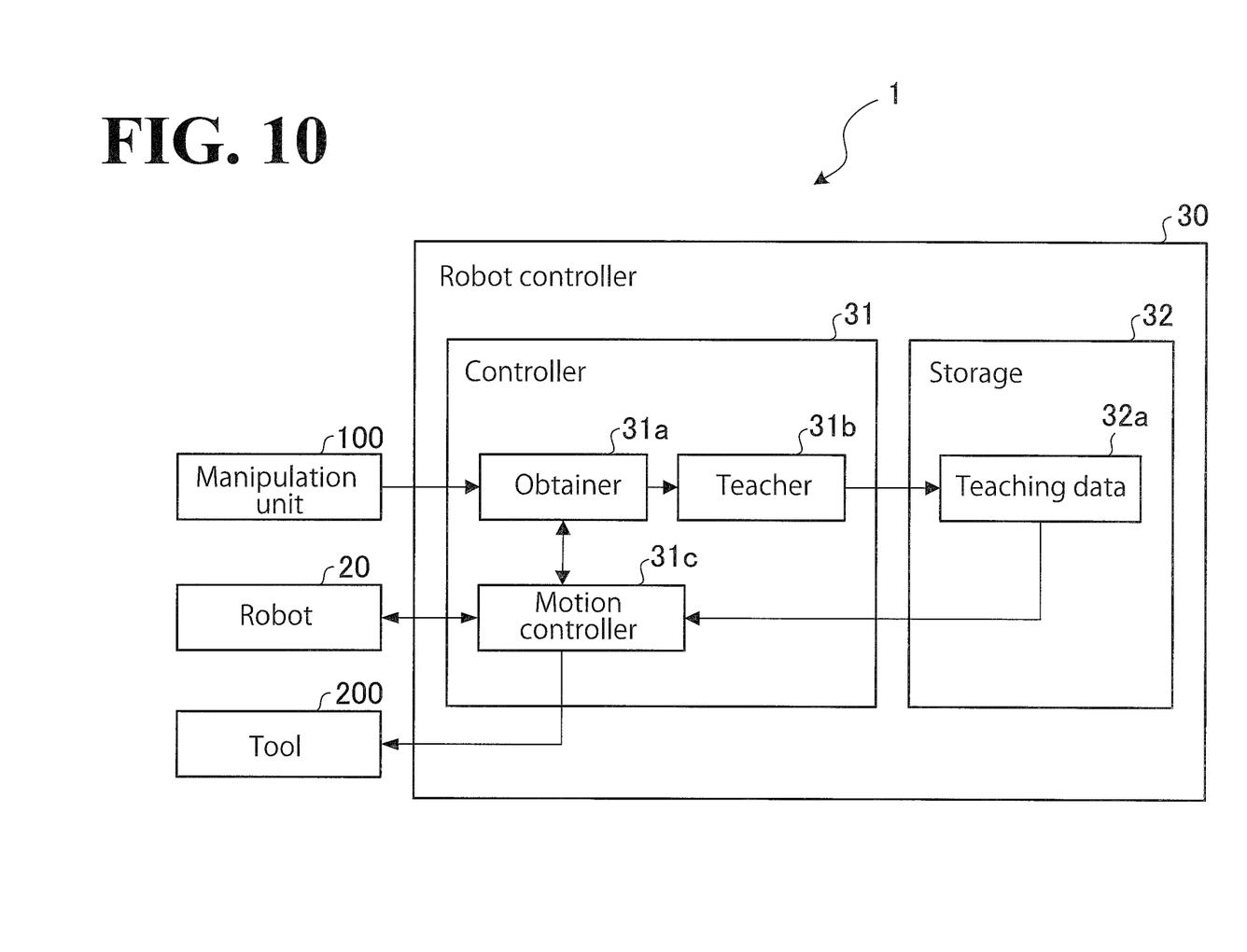
FIG. 10 is a block diagram illustrating a configuration of a robot system.

A configuration of a robot system 1 will be described by referring to FIG. 10. FIG. 10 is a block diagram illustrating a configuration of the robot system 1. As illustrated in FIG. 10, the robot system 1 includes the robot 20, a robot controller 30, the manipulation unit 100, and the tool 200.

The following description is mainly regarding a configuration of the robot controller 30, omitting description of the manipulation unit 100 and the tool 200, which has already been made earlier. A configuration of the robot 20 will be described later by referring to FIG. 11.

As illustrated in FIG. 10, the robot controller 30 is connected with the manipulation unit 100, the robot 20, and the tool 200. The robot controller 30 includes a controller 31 and a storage 32.

The controller 31 includes an obtainer 31a, a teacher 31b, and a motion controller 31c. The storage 32 stores teaching data 32a. The robot controller 30 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs to serve the functions of the obtainer 31a, the teacher 31b, and the motion controller 31c of the controller 31.

Also, at least one or all of the obtainer 31a, the teacher 31b, and the motion controller 31c may be implemented by hardware such as ASIC (Application Specific Integrated Circuit) and FPGA (Field Programmable Gate Array).

The storage 32 corresponds to the RAM and/or the HDD. The RAM and the HDD are capable of storing the teaching data 32a. It will be understood by those skilled in the art that the robot controller 30 may obtain the above-described programs and various kinds of information from another computer connected to the robot controller 30 through a wired or wireless network or from a portable recording medium.

The controller 31 performs motion control of the robot 20 and the tool 200. The controller 31 is adapted to direct teaching performed by the user based on a result of manipulating the manipulation unit 100. Direct teaching is to, while changing the posture of the robot 20, manually and directly teach the robot 20 which motion path to take and teach the tool 200 how to move. In the direct teaching, the controller 31 also controls a lead-through operation, which is to change the posture of the robot 20 using the manipulation force with which the user manipulates the robot 20.

The obtainer 31a obtains a manipulation situation of the various buttons on the manipulation unit 100. When the obtained manipulation situation is a particular manipulation situation, the obtainer 31a obtains the current posture of the robot 20 from the motion controller 31c and/or instructs a lead-through operation of the robot 20 to the motion controller 31c.

For example, when the obtained manipulation situation is that the teaching button 130a (see FIG. 7) has been pressed, the obtainer 31a forwards the current posture of the robot 20 obtained from the motion controller 31c to the teacher 31b. While the enabling button 130b (see FIG. 7) is being pressed, the obtainer 31a instructs a lead-through operation of the robot 20 to the motion controller 31c.

The teacher 31b, based on the input from the obtainer 31a, outputs teaching information of the direct teaching to the teaching data 32a stored in the storage 32. The teaching data 32a is information that is prepared in the teaching stage, which includes the direct teaching of manually teaching an operation to the robot 20, and that contains "jobs" constituting a program defining a motion path for the robot 20.

The motion controller 31c causes the robot 20 and the tool 200 to move based on the teaching data 32a. The motion controller 31c also improves motion accuracy of the robot 20 by, for example, performing feedback control using a value from an encoder of an actuator such as the motor of the robot 20, which is the motive power source of the robot 20. Further, in response to a demand from the obtainer 31a, the motion controller 31c calculates the posture of the robot 20 based on the encoder value and sends the posture of the robot 20 to the obtainer 31a.

Figure 11:
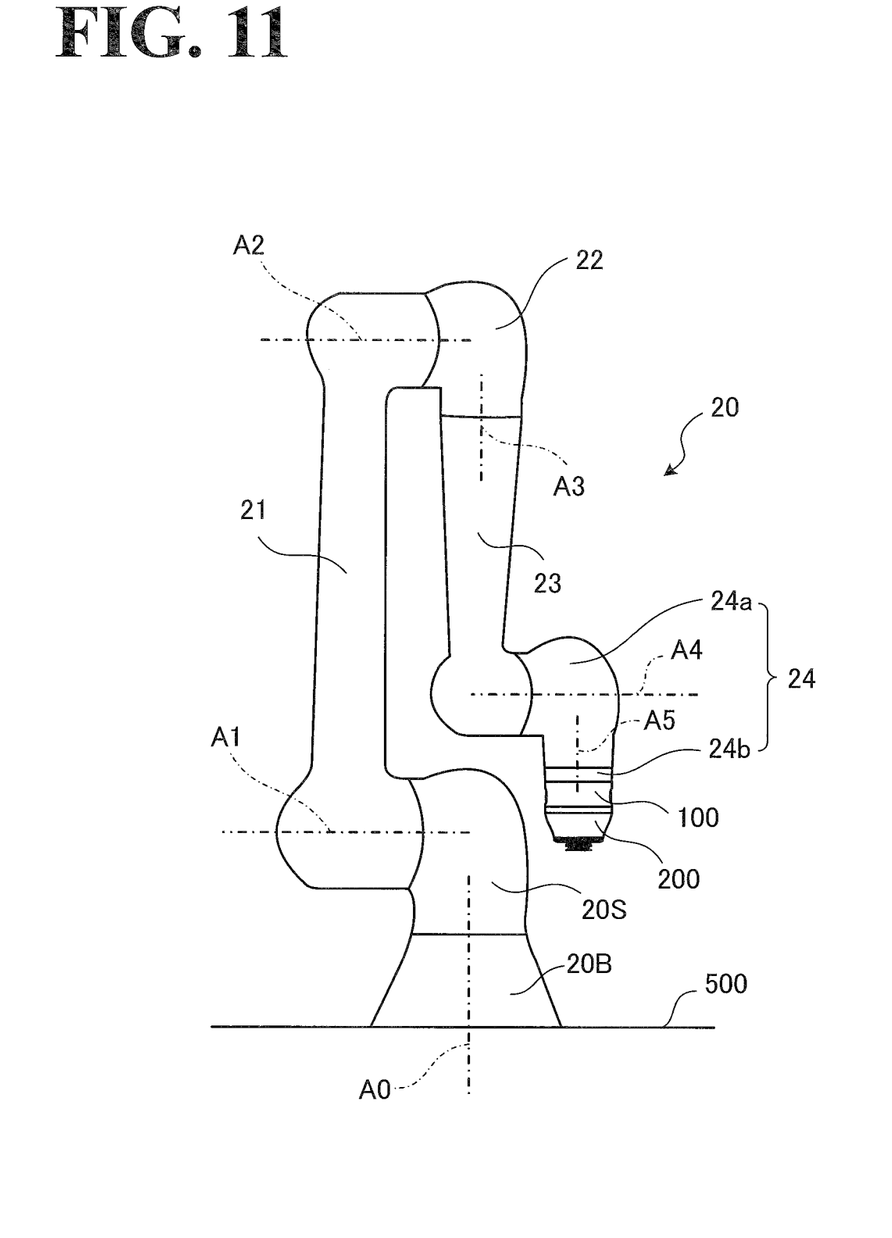
FIG. 11 is a side view of a configuration of a robot.

An exemplary configuration of the robot 20 will be described by referring to FIG. 11. FIG. 11 is a side view of a configuration of the robot 20. The robot 20 is a "collaborative robot". A collaborative robot has a smooth texture and secures sufficient gaps between movable parts of the robot such as arms to prevent human body parts from becoming caught between movable parts of the robot.

The robot 20 has an internal space extending between the base end and the leading end of the robot 20. The internal space contains cables for the tool 200 and other cables and/or wires. This ensures that these cables and wires do not interfere with direct teaching of the robot 20 and work performed by the robot 20. The robot 20 illustrated in FIG. 11 is a fixed type robot. In another possible embodiment, the robot 20 may be placed on a travel platform that is able to travel freely.

As illustrated in FIG. 11, the robot 20 6 is a "vertical multi-articular robot" having six axes, namely, vertical axis A0, second axis A2, third axis A3, fourth axis A4, and fifth axis A5. The robot 20 includes (in increasing order of distance from the base end) a base 20B, a turnable portion 20S, a first arm 21, a second arm 22, a third arm 23, and a wrist 24.

The base 20B is fixed to a ground plane 500, such as a floor. The turnable portion 20S is supported by the base 20B and is turnable about the vertical axis A0, which is perpendicular to the ground plane 500. The first arm 21, at is base end, is supported by the turnable portion 20S and is turnable about the first axis A1, which is perpendicular to the vertical axis A0. The second arm 22, at is base end, is supported by the leading end of the first arm 21 and is turnable about the second axis A2, which is parallel to the first axis A1.

The third arm 23, at is base end, is supported by the leading end of the second arm 22 and is rotatable about the third axis A3, which is perpendicular to the second axis A2. The wrist 24 includes a base end 24a and a leading end 24b. The base end 24a, at is base end, is supported by the leading end of the third arm 23 and is turnable about the fourth axis A4, which is perpendicular to the third axis A3.

The leading end 24b, at is base end, is supported by the leading end of the base end 24a and is rotatable about the fifth axis A5, which is orthogonal to the fourth axis A4. To the leading end of the leading end 24b, the manipulation unit 100 is attached. To the leading end of the manipulation unit 100, the tool 200 is attached.

When the user performs direct teaching to the robot 20, the user holds the manipulation unit 100 and changes the posture of the robot 20. Then, the user manipulates the manipulated portions 130 (see FIG. 1) of the manipulation unit 100 to make various instructions associated with direct teaching.

Figure 12:
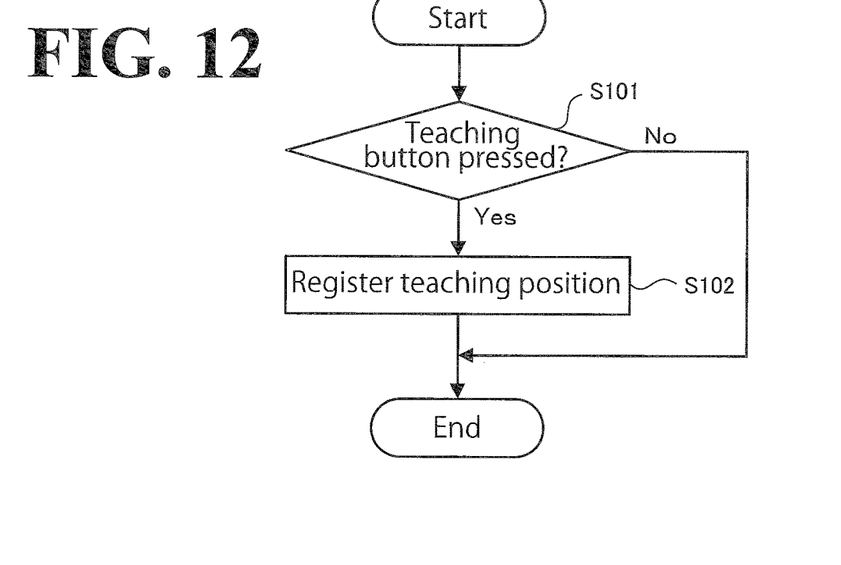
FIG. 12 is a first flowchart of a procedure for processing performed by a robot controller.
Figure 13:
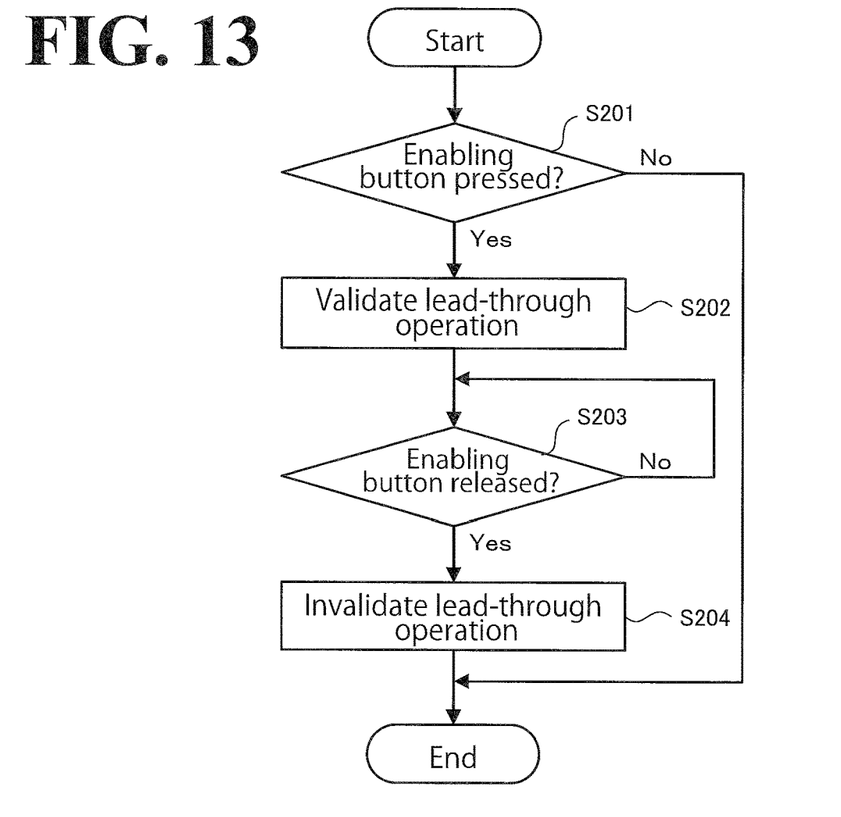
FIG. 13 is a second flowchart of a procedure for processing performed by the robot controller.

Procedures for processing performed by the robot controller 30 illustrated in FIG. 10 will be described by referring to FIGS. 12 and 13. FIG. 12 is a first flowchart of a procedure for processing performed by the robot controller 30, and FIG. 13 is a second flowchart of a procedure for processing performed by the robot controller 30. Specifically, FIG. 12 shows a processing procedure in a case where the teaching button 130a (see FIG. 7) is manipulated, and FIG. 13 shows a processing procedure in a case where the enabling button 130b (see FIG. 7) is manipulated.

A case where the teaching button 130a is manipulated will be described first. As illustrated in FIG. 12, the obtainer 31a of the robot controller 30 determines whether the teaching button 130a of the manipulation unit 100 has been pressed (step S101). When the obtainer 31a has determined that the teaching button 130a has been pressed (Yes at step S101), the teacher 31b obtains from the motion controller 31c the posture of the robot 20 at the point of time when the teaching button 130a was pressed, and registers teaching position to the teaching data 32a based on the posture of the robot 20 (step S102). Then, the entire processing ends.

When the condition at step S101 is not satisfied (No at step S101), the entire processing ends, bypassing step S102. The processing illustrated in FIG. 12 is performed every time the teaching button 130a is pressed.

A case where the enabling button 130b is manipulated will be described. As illustrated in FIG. 13, the obtainer 31a of the robot controller 30 determines whether the enabling button 130b of the manipulation unit 100 has been pressed (step S201). When the obtainer 31a has determined that the enabling button 130b has been pressed (Yes at step S201), the motion controller 31c validates a lead-through operation of the robot 20 (step S202). When the condition at step S203 is not satisfied (No at step S203), the determination processing at step S203 is performed again.

Next, the obtainer 31a determines whether the enabling button 130b has been released (step S203). When the obtainer 31a has determined that the enabling button 130b has been released (Yes at step S203), the motion controller 31c invalidates the lead-through operation of the robot 20 (step S204). Then, the entire processing ends. When the condition at step S201 is not satisfied (No at step S201), the entire processing ends, bypassing step S202 and steps that follow.

As has been described hereinbefore, the manipulation unit 100 according to this embodiment includes the body 110, the tool holder 120, and the manipulated portions 130. The body 110 has a first end surface attached to an attachment target. The tool holder 120 is located on a second end surface of the body 110, and the tool 200 is attachable to the tool holder 120. The manipulated portions 130 are located on the circumferential outer surface of the body 110. The manipulated portions 130 each include a manipulated surface that is set deeper in the body 110 than a surrounding portion of the manipulated portion 130 surrounding the manipulated surface.

Thus, the manipulation unit 100 according to this embodiment is located between the attachment target and the tool 200, that is, located close to the tool 200. This enables users to perform direct teaching intuitively by manipulating the manipulated portions 130. Thus, the manipulation unit 100 provides improved manipulability in direct teaching.

While in the above-described embodiment the robot 20 is a six-axis robot, the robot 20 may be a robot having seven or more axes or may be a robot having equal to or less than five axes.

Obviously, numerous modifications and error of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A manipulation unit comprising:
a body having a first end, a second end opposite to the first end, and a cylindrical circumferential outer surface that extends from the first end to the second end and which is configured to be held to perform direct teaching to a robot, the first end being attachable to a leading end of a robot arm of the robot;
a tool holder connected to the second end and configured to hold a tool; and
a manipulated switch configured to send signal to a robot controller to perform the direct teaching, the manipulated switch being provided on the body and recessed within the cylindrical circumferential outer surface so that the direct teaching is performed with a hand which holds the cylindrical circumferential outer surface, the manipulated switch including a manipulated surface via which the manipulated switch is to be operated,
wherein the manipulated surface is recessed from the cylindrical circumferential outer surface,
wherein the cylindrical circumferential outer surface and the tool holder are configured to be flush with the leading end of the robot arm,
wherein the cylindrical circumferential outer surface has a same outer diameter at the second end as an end of the tool holder to which the cylindrical outer surface is flush,
wherein the leading end of the robot arm has the same outer diameter as the first end of the cylindrical circumferential outer surface to which the leading end of the robot arm is flush, and
wherein the cylindrical circumferential outer surface is configured to be held by the hand of a user and the manipulated switch is provided on the cylindrical circumferential outer surface so that the hand can actuate the manipulated switch while the hand holds the cylindrical circumferential outer surface to perform the direct teaching to the robot.

2. The manipulation unit according to claim 1, wherein the body has:
a first through hole extending between the first end and the second end of the body to penetrate the body; and
a second through hole penetrating the body and connected to the first through hole, and
wherein the manipulated switch is located in the second through hole.

3. The manipulation unit according to claim 2,
wherein the second through hole is included in a plurality of second through holes aligned at intervals in a circumferential direction of the body, and
wherein the manipulated switch is included in a plurality of manipulated switches located in the second through holes, respectively.

4. The manipulation unit according to claim 3, wherein the plurality of manipulated switch comprise:
a first group of manipulated switches aligned on the cylindrical circumferential outer surface of the body; and
a second group of manipulated switches aligned on the cylindrical circumferential outer surface of the body.

5. The manipulation unit according to claim 4, wherein the first group and the second group are point-symmetrical to each other relative to an axial center line of the cylindrical circumferential outer surface.

6. The manipulation unit according to claim 3, further comprising a manipulated-portion cable connected to the manipulated switches and routed in the circumferential direction of the body on an inner peripheral surface of the body defining the first through hole.

7. The manipulation unit according to claim 6, further comprising a connector configured to connect a tool cable and an attachment-target cable to each other when the tool cable is guided to the second through hole through the second end of the body and the attachment-target cable is guided to the second through hole through the first end of the body.

8. The manipulation unit according to claim 2, further comprising a manipulated-portion cable connected to the manipulated switch and routed in a circumferential direction of the body on an inner peripheral surface of the body defining the first through hole.

9. The manipulation unit according to claim 2, further comprising a connector configured to connect a tool cable and an attachment-target cable to each other when the tool cable is guided to the second through hole through the second end of the body and the attachment-target cable is guided to the second through hole through the first end of the body.

10. The manipulation unit according to claim 1, wherein the body has a through hole passing through the body from the first end to the second end to connect an inside of the robot arm and an inside of the tool holder.

11. The manipulation unit according to claim 1, wherein the manipulated surface is recessed from the cylindrical circumferential outer surface when the manipulated switch is in a non-pressed state.

12. The manipulation unit according to claim 1,
wherein the body has a through hole extending from the cylindrical circumferential outer surface to an interior of the body,
wherein the through hole includes a counterbore, and
wherein the manipulated switch is located in the second through hole and is seated within the counterbore.

13. The manipulation unit according to claim 1, wherein the body does not have any protrusions that protrude from the cylindrical circumferential outer surface that extends from the first end attachable to the leading end of the robot arm to the second end connected to the tool holder.

14. A robot comprising:
a wrist having a leading end; and
a manipulation unit comprising:
a body having a first end, a second end opposite to the first end, and a cylindrical circumferential outer surface that extends from the first end to the second end and which is configured to be held to perform direct teaching to the robot, the first end being attached to the leading end;
a tool holder connected to the second end and configured to hold a tool; and
a manipulated switch configured to send signal to a robot controller to perform the direct teaching, the manipulated switch being provided on the body and recessed within the cylindrical circumferential outer surface so that the direct teaching is performed with a hand which holds the cylindrical circumferential outer surface, the manipulated switch comprising a manipulated surface via which a robot arm is to be operated, the manipulated surface is recessed from the cylindrical circumferential outer surface,
wherein the leading end of the wrist, the cylindrical circumferential outer surface, and the tool holder are flush with each other, wherein the cylindrical circumferential outer surface has a same outer diameter at the second end as an end of the tool holder to which the cylindrical outer surface is flush, wherein the leading end of the wrist has the same outer diameter as the first end of the cylindrical circumferential outer surface to which the leading end of the wrist arm is flush, and wherein the cylindrical circumferential outer surface is configured to be held by the hand of a user and the manipulated switch is provided on the cylindrical circumferential outer surface so that the hand can actuate the manipulated switch while the hand holds the cylindrical circumferential outer surface to perform the direct teaching to the robot.

15. The robot according to claim 14, wherein the manipulated switch of the manipulation unit comprises a teaching button used to register a posture of the robot as a teaching position.

16. The robot according to claim 14, wherein the manipulated switch of the manipulation unit comprises an enabling button used to validate a lead-through operation, the lead-through operation comprising changing a posture of the robot using a manipulation force with which a user manipulates the robot.

17. The robot according to claim 14, wherein the manipulated surface is recessed from the cylindrical circumferential outer surface when the manipulated switch is in a non-pressed state.

18. The robot according to claim 14,
wherein the body has a through hole extending from the cylindrical circumferential outer surface to an interior of the body,
wherein the through hole includes a counterbore, and
wherein the manipulated switch is located in the second through hole and is seated within the counterbore.

19. The robot according to claim 14, wherein the body does not have any protrusions that protrude from the cylindrical circumferential outer surface that extends from the first end attached to the leading end of the wrist to the second end connected to the tool holder.

* * * * *